(12) United States Patent
Spray (10) Patent No.: US 11,053,645 B2
(45) Date of Patent: Jul. 6, 2021

(54) LOW RESIDUAL SPRAY PAVING COATING AND METHOD

(71) Applicant: VENTURE CORPORATION, Great Bend, KS (US)

(72) Inventor: Orville Spray, Great Bend, KS (US)

(*) Notice: Subject to any disclaimer, the term of this patent is extended or adjusted under 35 U.S.C. 154(b) by 161 days.

(21) Appl. No.: 16/059,247

(22) Filed: Aug. 9, 2018

(65) Prior Publication Data
US 2020/0048842 A1 Feb. 13, 2020

(51) Int. Cl.
| | |
|---|---|
| *E01C 7/18* | (2006.01) |
| *E01C 7/35* | (2006.01) |
| *E01C 7/08* | (2006.01) |
| *E01C 7/24* | (2006.01) |
| *E01C 7/22* | (2006.01) |

(52) U.S. Cl.
CPC ............. *E01C 7/353* (2013.01); *E01C 7/085* (2013.01); *E01C 7/182* (2013.01); *E01C 7/22* (2013.01); *E01C 7/24* (2013.01)

(58) Field of Classification Search
CPC ... E01C 7/182; E01C 7/22; E01C 7/24; E01C 7/353
USPC ...................................... 404/27, 82; 427/138
See application file for complete search history.

(56) References Cited

U.S. PATENT DOCUMENTS

| | | | | | |
|---|---|---|---|---|---|
| 4,007,995 | A | * | 2/1977 | Rofidal ................... | E01C 7/353 404/77 |
| 5,895,173 | A | * | 4/1999 | O'Brien ................. | E01C 19/21 404/108 |
| 6,444,258 | B1 | * | 9/2002 | Terry ...................... | E01C 7/185 427/136 |
| 6,918,714 | B2 | * | 7/2005 | Chambard ............ | E01C 19/176 404/111 |
| 7,802,941 | B2 | * | 9/2010 | Wingo .................... | E01C 7/353 404/17 |
| 8,329,250 | B2 | * | 12/2012 | Exline ..................... | C08L 95/00 427/138 |

(Continued)

FOREIGN PATENT DOCUMENTS

| | | |
|---|---|---|
| CN | 106149500 | 11/2016 |
| CN | 106917334 | 7/2017 |
| EP | 2388296 | 11/2011 |

OTHER PUBLICATIONS

International Search Report and Written Opinion dated Nov. 18, 2019 in International Application No. PCT/US2019/045441, 13 pages.

(Continued)

*Primary Examiner* — Gary S Hartmann
(74) *Attorney, Agent, or Firm* — Shook, Hardy & Bacon, LLP (57) ABSTRACT

A paving mixture for application to a surface and a method for the same. The mixture comprises a binding material layer applied to the surface to form a base layer on the surface, and an aggregate material layer applied on top of the binding material layer. The binding material layer can be applied in an amount of at most 0.125 gallons/yd$^2$. The aggregate material layer contains an asphalt mixture that provides a road surface. The aggregate material layer and the binding material layer can be combined on the surface within 30 seconds of application of the binding material layer. Additionally, multiple paving mixtures may be applied to the surface.

20 Claims, 6 Drawing Sheets

(56) References Cited

U.S. PATENT DOCUMENTS

| | | |
|---|---|---|
| 9,890,299 B1 | 2/2018 | Spray |
| 2003/0044522 A1 | 3/2003 | Isozaki |

OTHER PUBLICATIONS

International Preliminary Report on Patentability received for PCT Application No. PCT/US2019/045441, dated Feb. 18, 2021, 11 pages.

* cited by examiner

| Pg in Mix | 5.00% |
|---|---|
| Residue in Binding Material | 75% |
| Specific Gravity of Mix (Gmb) Typical | 2.343 |
| PCF of Mix (lb/ft) | 145.83 |

Dense Graded Mix (Superpave, etc)

Binding Material as % of total AC
Shot Rate (gal/yd²)

| Thickness (in) | Aggregate Material Spread Rate (lbs/yd²) | 0.025 | 0.030 | 0.035 | 0.040 | 0.045 | 0.050 | 0.055 | 0.060 | 0.065 | 0.070 | 0.075 | 0.080 | 0.085 | 0.090 | 0.095 | 0.100 | 0.105 | 0.110 | 0.115 | 0.120 | 0.125 |
|---|---|---|---|---|---|---|---|---|---|---|---|---|---|---|---|---|---|---|---|---|---|---|
| 0.75 | 82.0 | 3.53% | 4.20% | 4.87% | 5.53% | 6.18% | 6.82% | 7.45% | 8.07% | 8.68% | 9.29% | 9.89% | 10.48% | 11.06% | 11.63% | 12.20% | 12.76% | 13.32% | 13.86% | 14.40% | 14.93% | 15.46% |
| 1.00 | 109.4 | 2.67% | 3.19% | 3.70% | 4.20% | 4.71% | 5.20% | 5.69% | 6.18% | 6.66% | 7.13% | 7.60% | 8.07% | 8.53% | 8.99% | 9.44% | 9.89% | 10.33% | 10.77% | 11.20% | 11.63% | 12.06% |
| 1.25 | 136.7 | 2.15% | 2.57% | 2.98% | 3.39% | 3.80% | 4.20% | 4.61% | 5.00% | 5.40% | 5.79% | 6.18% | 6.56% | 6.94% | 7.32% | 7.70% | 8.07% | 8.44% | 8.81% | 9.17% | 9.53% | 9.89% |
| 1.50 | 164.1 | 1.80% | 2.15% | 2.50% | 2.84% | 3.19% | 3.53% | 3.87% | 4.20% | 4.54% | 4.87% | 5.20% | 5.53% | 5.85% | 6.18% | 6.50% | 6.82% | 7.13% | 7.45% | 7.76% | 8.07% | 8.38% |
| 1.75 | 191.4 | 1.54% | 1.85% | 2.15% | 2.45% | 2.74% | 3.04% | 3.33% | 3.63% | 3.92% | 4.20% | 4.49% | 4.78% | 5.06% | 5.34% | 5.62% | 5.90% | 6.18% | 6.45% | 6.73% | 7.00% | 7.27% |
| 2.00 | 218.7 | 1.35% | 1.62% | 1.88% | 2.15% | 2.41% | 2.67% | 2.93% | 3.19% | 3.44% | 3.70% | 3.95% | 4.20% | 4.46% | 4.71% | 4.95% | 5.20% | 5.45% | 5.69% | 5.93% | 6.18% | 6.42% |
| 2.25 | 246.1 | 1.20% | 1.44% | 1.68% | 1.91% | 2.15% | 2.38% | 2.61% | 2.84% | 3.07% | 3.30% | 3.53% | 3.75% | 3.98% | 4.20% | 4.43% | 4.65% | 4.87% | 5.09% | 5.31% | 5.53% | 5.75% |
| 2.50 | 273.4 | 1.09% | 1.30% | 1.51% | 1.73% | 1.94% | 2.15% | 2.36% | 2.57% | 2.77% | 2.98% | 3.19% | 3.39% | 3.60% | 3.80% | 4.00% | 4.20% | 4.41% | 4.61% | 4.80% | 5.00% | 5.20% |
| 2.75 | 300.8 | 0.99% | 1.18% | 1.38% | 1.57% | 1.76% | 1.96% | 2.15% | 2.34% | 2.53% | 2.72% | 2.91% | 3.09% | 3.28% | 3.47% | 3.65% | 3.84% | 4.02% | 4.20% | 4.39% | 4.57% | 4.75% |
| 3.00 | 328.1 | 0.91% | 1.09% | 1.26% | 1.44% | 1.62% | 1.80% | 1.97% | 2.15% | 2.32% | 2.50% | 2.67% | 2.84% | 3.01% | 3.19% | 3.36% | 3.53% | 3.70% | 3.87% | 4.04% | 4.20% | 4.37% |
| 3.25 | 355.5 | 0.84% | 1.00% | 1.17% | 1.33% | 1.50% | 1.66% | 1.82% | 1.99% | 2.15% | 2.31% | 2.47% | 2.63% | 2.79% | 2.95% | 3.11% | 3.27% | 3.42% | 3.58% | 3.74% | 3.89% | 4.05% |
| 3.50 | 382.8 | 0.78% | 0.93% | 1.09% | 1.24% | 1.39% | 1.54% | 1.69% | 1.85% | 2.00% | 2.15% | 2.30% | 2.45% | 2.60% | 2.74% | 2.89% | 3.04% | 3.19% | 3.33% | 3.48% | 3.63% | 3.77% |
| 3.75 | 410.1 | 0.73% | 0.87% | 1.01% | 1.16% | 1.30% | 1.44% | 1.58% | 1.73% | 1.87% | 2.01% | 2.15% | 2.29% | 2.43% | 2.57% | 2.70% | 2.84% | 2.98% | 3.12% | 3.26% | 3.39% | 3.53% |
| 4.00 | 437.5 | 0.68% | 0.82% | 0.95% | 1.09% | 1.22% | 1.35% | 1.49% | 1.62% | 1.75% | 1.88% | 2.02% | 2.15% | 2.28% | 2.41% | 2.54% | 2.67% | 2.80% | 2.93% | 3.06% | 3.19% | 3.32% |

FIG. 5A

| Pg in Mix | 5.00% |
| --- | --- |
| Residue in Binding Material | 80% |
| Specific Gravity of Mix (Gmb) Typical | 2.343 |
| PCF of Mix (lb/ft) | 145.83 |

Dense Graded Mix (Superpave, etc)

Binding Material as % of total AC
Shot Rate (gal/yd²)

502B

| Thickness (in) | Aggregate Material Spread Rate (lbs/yd²) | 0.025 | 0.030 | 0.035 | 0.040 | 0.045 | 0.050 | 0.055 | 0.060 | 0.065 | 0.070 | 0.075 | 0.080 | 0.085 | 0.090 | 0.095 | 0.100 | 0.105 | 0.110 | 0.115 | 0.120 | 0.125 |
| --- | --- | --- | --- | --- | --- | --- | --- | --- | --- | --- | --- | --- | --- | --- | --- | --- | --- | --- | --- | --- | --- | --- |
| 0.75 | 82.0 | 3.75% | 4.47% | 5.18% | 5.88% | 6.56% | 7.24% | 7.90% | 8.56% | 9.21% | 9.85% | 10.48% | 11.10% | 11.71% | 12.31% | 12.91% | 13.50% | 14.08% | 14.65% | 15.21% | 15.77% | 16.32% |
| 1.00 | 109.4 | 2.84% | 3.39% | 3.93% | 4.47% | 5.00% | 5.53% | 6.05% | 6.56% | 7.07% | 7.57% | 8.07% | 8.56% | 9.05% | 9.53% | 10.01% | 10.48% | 10.94% | 11.41% | 11.86% | 12.31% | 12.76% |
| 1.25 | 136.7 | 2.29% | 2.73% | 3.17% | 3.61% | 4.04% | 4.47% | 4.90% | 5.32% | 5.74% | 6.15% | 6.56% | 6.97% | 7.37% | 7.77% | 8.17% | 8.56% | 8.95% | 9.34% | 9.72% | 10.10% | 10.48% |
| 1.50 | 164.1 | 1.91% | 2.29% | 2.66% | 3.03% | 3.39% | 3.75% | 4.11% | 4.47% | 4.83% | 5.18% | 5.53% | 5.88% | 6.22% | 6.56% | 6.90% | 7.24% | 7.57% | 7.90% | 8.23% | 8.56% | 8.89% |
| 1.75 | 191.4 | 1.64% | 1.97% | 2.29% | 2.61% | 2.92% | 3.24% | 3.55% | 3.86% | 4.17% | 4.47% | 4.78% | 5.08% | 5.38% | 5.68% | 5.97% | 6.27% | 6.56% | 6.85% | 7.14% | 7.43% | 7.71% |
| 2.00 | 218.7 | 1.44% | 1.73% | 2.01% | 2.29% | 2.57% | 2.84% | 3.12% | 3.39% | 3.66% | 3.93% | 4.20% | 4.47% | 4.74% | 5.00% | 5.27% | 5.53% | 5.79% | 6.05% | 6.31% | 6.56% | 6.82% |
| 2.25 | 246.1 | 1.28% | 1.54% | 1.79% | 2.04% | 2.29% | 2.53% | 2.78% | 3.03% | 3.27% | 3.51% | 3.75% | 3.99% | 4.23% | 4.47% | 4.71% | 4.94% | 5.18% | 5.41% | 5.64% | 5.88% | 6.10% |
| 2.50 | 273.4 | 1.16% | 1.38% | 1.61% | 1.84% | 2.06% | 2.29% | 2.51% | 2.73% | 2.95% | 3.17% | 3.39% | 3.61% | 3.83% | 4.04% | 4.26% | 4.47% | 4.69% | 4.90% | 5.11% | 5.32% | 5.53% |
| 2.75 | 300.8 | 1.05% | 1.26% | 1.47% | 1.67% | 1.88% | 2.08% | 2.29% | 2.49% | 2.69% | 2.89% | 3.09% | 3.29% | 3.49% | 3.69% | 3.89% | 4.08% | 4.28% | 4.47% | 4.67% | 4.86% | 5.05% |
| 3.00 | 328.1 | 0.97% | 1.16% | 1.35% | 1.54% | 1.73% | 1.91% | 2.10% | 2.29% | 2.47% | 2.66% | 2.84% | 3.03% | 3.21% | 3.39% | 3.57% | 3.75% | 3.93% | 4.11% | 4.29% | 4.47% | 4.65% |
| 3.25 | 355.5 | 0.89% | 1.07% | 1.24% | 1.42% | 1.59% | 1.77% | 1.94% | 2.11% | 2.29% | 2.46% | 2.63% | 2.80% | 2.97% | 3.14% | 3.31% | 3.48% | 3.64% | 3.81% | 3.98% | 4.14% | 4.31% |
| 3.50 | 382.8 | 0.83% | 0.99% | 1.16% | 1.32% | 1.48% | 1.64% | 1.81% | 1.97% | 2.13% | 2.29% | 2.45% | 2.61% | 2.76% | 2.92% | 3.08% | 3.24% | 3.39% | 3.55% | 3.70% | 3.86% | 4.01% |
| 3.75 | 410.1 | 0.77% | 0.93% | 1.08% | 1.23% | 1.38% | 1.54% | 1.69% | 1.84% | 1.99% | 2.14% | 2.29% | 2.44% | 2.58% | 2.73% | 2.88% | 3.03% | 3.17% | 3.32% | 3.46% | 3.61% | 3.75% |
| 4.00 | 437.5 | 0.73% | 0.87% | 1.01% | 1.16% | 1.30% | 1.44% | 1.58% | 1.73% | 1.87% | 2.01% | 2.15% | 2.29% | 2.43% | 2.57% | 2.70% | 2.84% | 2.98% | 3.12% | 3.26% | 3.39% | 3.53% |

| Pg in Mix | | 5.00% |
|---|---|---|
| Residue in Binding Material | | 85% |
| Specific Gravity of Mix (Gmb) Typical | | 2.343 |
| PCF of Mix (lb/ft) | | 145.83 |

Dense Graded Mix (Superpave, etc)

Binding Material as % of total AC
Shot Rate (gal/yd²)

| Thickness (in) | Aggregate Material Spread Rate (lbs/yd²) | 0.025 | 0.030 | 0.035 | 0.040 | 0.045 | 0.050 | 0.055 | 0.060 | 0.065 | 0.070 | 0.075 | 0.080 | 0.085 | 0.090 | 0.095 | 0.100 | 0.105 | 0.110 | 0.115 | 0.120 | 0.125 |
|---|---|---|---|---|---|---|---|---|---|---|---|---|---|---|---|---|---|---|---|---|---|---|
| 0.75 | 82.0 | 3.98% | 4.74% | 5.48% | 6.22% | 6.94% | 7.66% | 8.36% | 9.05% | 9.73% | 10.40% | 11.06% | 11.71% | 12.35% | 12.98% | 13.61% | 14.22% | 14.83% | 15.42% | 16.01% | 16.59% | 17.17% |
| 1.00 | 109.4 | 3.01% | 3.60% | 4.17% | 4.74% | 5.30% | 5.85% | 6.40% | 6.94% | 7.48% | 8.01% | 8.53% | 9.05% | 9.56% | 10.06% | 10.56% | 11.06% | 11.55% | 12.03% | 12.51% | 12.98% | 13.45% |
| 1.25 | 136.7 | 2.43% | 2.90% | 3.36% | 3.83% | 4.28% | 4.74% | 5.19% | 5.63% | 6.07% | 6.51% | 6.94% | 7.37% | 7.80% | 8.22% | 8.63% | 9.05% | 9.46% | 9.86% | 10.27% | 10.66% | 11.06% |
| 1.50 | 164.1 | 2.03% | 2.43% | 2.82% | 3.21% | 3.60% | 3.98% | 4.36% | 4.74% | 5.11% | 5.48% | 5.85% | 6.22% | 6.58% | 6.94% | 7.30% | 7.66% | 8.01% | 8.36% | 8.70% | 9.05% | 9.39% |
| 1.75 | 191.4 | 1.75% | 2.09% | 2.43% | 2.76% | 3.10% | 3.43% | 3.76% | 4.09% | 4.41% | 4.74% | 5.06% | 5.38% | 5.70% | 6.01% | 6.32% | 6.63% | 6.94% | 7.25% | 7.55% | 7.86% | 8.16% |
| 2.00 | 218.7 | 1.53% | 1.83% | 2.13% | 2.43% | 2.72% | 3.01% | 3.31% | 3.60% | 3.88% | 4.17% | 4.46% | 4.74% | 5.02% | 5.30% | 5.58% | 5.85% | 6.13% | 6.40% | 6.67% | 6.94% | 7.21% |
| 2.25 | 246.1 | 1.36% | 1.63% | 1.90% | 2.16% | 2.43% | 2.69% | 2.95% | 3.21% | 3.47% | 3.72% | 3.98% | 4.23% | 4.49% | 4.74% | 4.99% | 5.24% | 5.48% | 5.73% | 5.98% | 6.22% | 6.46% |
| 2.50 | 273.4 | 1.23% | 1.47% | 1.71% | 1.95% | 2.19% | 2.43% | 2.66% | 2.90% | 3.13% | 3.36% | 3.60% | 3.83% | 4.06% | 4.28% | 4.51% | 4.74% | 4.96% | 5.19% | 5.41% | 5.63% | 5.85% |
| 2.75 | 300.8 | 1.12% | 1.34% | 1.56% | 1.78% | 1.99% | 2.21% | 2.43% | 2.64% | 2.86% | 3.07% | 3.28% | 3.49% | 3.70% | 3.91% | 4.12% | 4.33% | 4.53% | 4.74% | 4.94% | 5.15% | 5.35% |
| 3.00 | 328.1 | 1.03% | 1.23% | 1.43% | 1.63% | 1.83% | 2.03% | 2.23% | 2.43% | 2.62% | 2.82% | 3.01% | 3.21% | 3.40% | 3.60% | 3.79% | 3.98% | 4.17% | 4.36% | 4.55% | 4.74% | 4.93% |
| 3.25 | 355.5 | 0.95% | 1.13% | 1.32% | 1.51% | 1.69% | 1.88% | 2.06% | 2.24% | 2.43% | 2.61% | 2.79% | 2.97% | 3.15% | 3.33% | 3.51% | 3.69% | 3.86% | 4.04% | 4.21% | 4.39% | 4.56% |
| 3.50 | 382.8 | 0.88% | 1.05% | 1.23% | 1.40% | 1.57% | 1.75% | 1.92% | 2.09% | 2.26% | 2.43% | 2.60% | 2.76% | 2.93% | 3.10% | 3.26% | 3.43% | 3.60% | 3.76% | 3.93% | 4.09% | 4.25% |
| 3.75 | 410.1 | 0.82% | 0.98% | 1.15% | 1.31% | 1.47% | 1.63% | 1.79% | 1.95% | 2.11% | 2.27% | 2.43% | 2.58% | 2.74% | 2.90% | 3.05% | 3.21% | 3.36% | 3.52% | 3.67% | 3.83% | 3.98% |
| 4.00 | 437.5 | 0.77% | 0.92% | 1.08% | 1.23% | 1.38% | 1.53% | 1.68% | 1.83% | 1.98% | 2.13% | 2.28% | 2.43% | 2.57% | 2.72% | 2.87% | 3.01% | 3.16% | 3.31% | 3.45% | 3.60% | 3.74% |

FIG. 5C

| Pg in Mix | | 5.00% |
| --- | --- | --- |
| Residue in Binding Material | | 90% |
| Specific Gravity of Mix (Gmb) Typical | | 2.343 |
| PCF of Mix (lb/ft) | | 145.83 |

Dense Graded Mix (Superpave, etc)

Binding Material as % of total AC
Shot Rate (gal/yd²)

| Thickness (in) | Aggregate Material Spread Rate (lbs/yd²) 502D | 0.025 | 0.030 | 0.035 | 0.040 | 0.045 | 0.050 | 0.055 | 0.060 | 0.065 | 0.070 | 0.075 | 0.080 | 0.085 | 0.090 | 0.095 | 0.100 | 0.105 | 0.110 | 0.115 | 0.120 | 0.125 |
| --- | --- | --- | --- | --- | --- | --- | --- | --- | --- | --- | --- | --- | --- | --- | --- | --- | --- | --- | --- | --- | --- | --- |
| 0.75 | 82.0 | 4.20% | 5.00% | 5.79% | 6.56% | 7.32% | 8.07% | 8.81% | 9.53% | 10.24% | 10.94% | 11.63% | 12.31% | 12.98% | 13.64% | 14.29% | 14.93% | 15.56% | 16.18% | 16.80% | 17.40% | 17.99% |
| 1.00 | 109.4 | 3.19% | 3.80% | 4.41% | 5.00% | 5.59% | 6.18% | 6.75% | 7.32% | 7.88% | 8.44% | 8.99% | 9.53% | 10.06% | 10.59% | 11.12% | 11.63% | 12.15% | 12.65% | 13.15% | 13.64% | 14.13% |
| 1.25 | 136.7 | 2.57% | 3.06% | 3.56% | 4.04% | 4.53% | 5.00% | 5.48% | 5.94% | 6.41% | 6.87% | 7.32% | 7.77% | 8.22% | 8.66% | 9.10% | 9.53% | 9.96% | 10.38% | 10.80% | 11.22% | 11.63% |
| 1.50 | 164.1 | 2.15% | 2.57% | 2.98% | 3.39% | 3.80% | 4.20% | 4.61% | 5.00% | 5.40% | 5.79% | 6.18% | 6.56% | 6.94% | 7.32% | 7.70% | 8.07% | 8.44% | 8.81% | 9.17% | 9.53% | 9.89% |
| 1.75 | 191.4 | 1.85% | 2.21% | 2.57% | 2.92% | 3.27% | 3.63% | 3.97% | 4.32% | 4.66% | 5.00% | 5.34% | 5.68% | 6.01% | 6.34% | 6.67% | 7.00% | 7.32% | 7.64% | 7.96% | 8.28% | 8.60% |
| 2.00 | 218.7 | 1.62% | 1.94% | 2.25% | 2.57% | 2.88% | 3.19% | 3.49% | 3.80% | 4.10% | 4.41% | 4.71% | 5.00% | 5.30% | 5.59% | 5.89% | 6.18% | 6.47% | 6.75% | 7.04% | 7.32% | 7.60% |
| 2.25 | 246.1 | 1.44% | 1.73% | 2.01% | 2.29% | 2.57% | 2.84% | 3.12% | 3.39% | 3.66% | 3.93% | 4.20% | 4.47% | 4.74% | 5.00% | 5.27% | 5.53% | 5.79% | 6.05% | 6.31% | 6.56% | 6.82% |
| 2.50 | 273.4 | 1.30% | 1.56% | 1.81% | 2.06% | 2.32% | 2.57% | 2.82% | 3.06% | 3.31% | 3.56% | 3.80% | 4.04% | 4.28% | 4.53% | 4.76% | 5.00% | 5.24% | 5.48% | 5.71% | 5.94% | 6.18% |
| 2.75 | 300.8 | 1.18% | 1.42% | 1.65% | 1.88% | 2.11% | 2.34% | 2.57% | 2.79% | 3.02% | 3.24% | 3.47% | 3.69% | 3.91% | 4.13% | 4.35% | 4.57% | 4.79% | 5.00% | 5.22% | 5.43% | 5.65% |
| 3.00 | 328.1 | 1.09% | 1.30% | 1.51% | 1.73% | 1.94% | 2.15% | 2.36% | 2.57% | 2.77% | 2.98% | 3.19% | 3.39% | 3.60% | 3.80% | 4.00% | 4.20% | 4.41% | 4.61% | 4.80% | 5.00% | 5.20% |
| 3.25 | 355.5 | 1.00% | 1.20% | 1.40% | 1.59% | 1.79% | 1.99% | 2.18% | 2.37% | 2.57% | 2.76% | 2.95% | 3.14% | 3.33% | 3.52% | 3.71% | 3.89% | 4.08% | 4.27% | 4.45% | 4.64% | 4.82% |
| 3.50 | 382.8 | 0.93% | 1.12% | 1.30% | 1.48% | 1.66% | 1.85% | 2.03% | 2.21% | 2.39% | 2.57% | 2.74% | 2.92% | 3.10% | 3.27% | 3.45% | 3.63% | 3.80% | 3.97% | 4.15% | 4.32% | 4.49% |
| 3.75 | 410.1 | 0.87% | 1.04% | 1.21% | 1.38% | 1.56% | 1.73% | 1.89% | 2.06% | 2.23% | 2.40% | 2.57% | 2.73% | 2.90% | 3.06% | 3.23% | 3.39% | 3.56% | 3.72% | 3.88% | 4.04% | 4.20% |
| 4.00 | 437.5 | 0.82% | 0.98% | 1.14% | 1.30% | 1.46% | 1.62% | 1.78% | 1.94% | 2.09% | 2.25% | 2.41% | 2.57% | 2.72% | 2.88% | 3.03% | 3.19% | 3.34% | 3.49% | 3.65% | 3.80% | 3.95% |

LOW RESIDUAL SPRAY PAVING COATING AND METHOD

FIELD OF THE INVENTION

The field of the invention relates to asphalt paving.

SUMMARY

Embodiments of the present invention are defined by the claims below, not this summary. This summary merely presents a high-level overview of various aspects of the invention and a selection of concepts that are further described below in the detailed description section. This summary is not intended to identify key or essential features of the claimed subject matter, nor is it intended to be used as an aid in isolation to determine the scope of the claimed subject matter. The scope of the invention is defined by the claims.

Some aspects of the paving mixtures described herein may provide, at a minimum, an improvement over traditional paving mixtures by reducing the amount of binding material used in a given lift and thereby reducing the bitumen pull through. The amount of binding material used may result in, at least a portion of, bitumen being pulled to the top of the road surface immediately prior to, during, or shortly after compaction (i.e. pull through). Traditionally, this pull through may limit the viability of the general use of a newly compacted road surface until the pulled bitumen is dispersed or an additional lift (i.e. a second paving mixture layer) is applied on top of the original lift. Using the binding material mixture described herein can allow a lift to be driven on without the need of additional steps.

In one aspect, the pavement described herein is the first of multiple pavement lifts that form the finished road. In contrast to previously built pavements, the pavement described herein is suitable for traffic soon after it is laid down because of the reduced pull through.

BRIEF DESCRIPTION OF THE SEVERAL VIEWS OF THE DRAWINGS

Illustrative embodiments of the present invention are described in detail below with reference to the attached drawing figures, wherein:

FIGS. 5a-d depict example shot rates of a binding material layer, in accordance with aspects of the present invention.

DETAILED DESCRIPTION

The subject matter of the various embodiments of the present invention is described with specificity in this disclosure to meet statutory requirements. However, the description is not intended to limit the scope of claims. Rather, the claimed subject matter may be embodied in various other ways to include different features, components, elements, combinations, and steps, similar to the ones described in this document, and in conjunction with other present and future technologies. Terms should not be interpreted as implying any particular order among or between various steps disclosed herein unless the stated order of steps is explicitly required. Many different arrangements of the various components depicted, as well as use of components not shown, are possible without departing from the scope of the claims below.

Some aspects of the paving mixtures described herein may provide, at a minimum, an improvement over traditional paving mixtures by reducing the amount of binding material used in a given lift and thereby reducing the bitumen pull through. Reducing the pull through allows a lift to be open to traffic with little or, even no, additional steps. Opening roads to traffic quickly, including during construction, provides an improved experience for drivers that use a road.

As mentioned, the amount of binding material used may result in, at least a portion of, bitumen being pulled to the top of the road surface immediately prior to, during, or shortly after compaction (i.e. pull through). Traditionally, this pull through may limit the viability of the general use of a newly compacted road surface until the pulled bitumen is dispersed or an additional lift (i.e. a second paving mixture layer) is applied on top of the original lift. Using the binding material mixture described herein can allow a lift to be driven on without the need of additional steps. In one aspect, the pavement described herein is the first of multiple pavement lifts that form the finished road.

As used herein, "less than" and "<" are used interchangeably; for example "90% is less than 100%" and "90%<100%" are interchangeable statements. Further, "less than or equal to", "less than and/or equal to", "at most", and "≤" are used interchangeably; for example "90% is less than or equal to 100%" and "90%≤100%" are interchangeable statements. "Greater than" and ">" are used interchangeably; for example "100% is greater than 90%" and "100%≥90%" are interchangeable statements. Additionally, "greater than or equal to", "greater than and/or equal to", and "≥" are used interchangeably; for example "100% is greater than or equal to 100%" and "100%≥90%" are interchangeable statements.

The paving mixture described herein can be used with any number of surfaces to provide an even, strong, water impermeable layer that is resistant to erosion and cracking. Surfaces to which the paving mixture may be applied include roads, streets, interstates, parking lots, airport runways, and other similar surfaces. For simplicity, all of these surfaces are described as "road surfaces" herein. These surfaces do not need to be a particular consistency, composition, or texture. The binding material layer combines with the aggregate material layer to give it elasticity, strength, and cohesion. The binding material layer also fills in cracks on the surface to which the paving mixture is applied. The aggregate material provides a firm structural component that will resist deformation.

The binding material layer provides a moisture barrier that prevents cracks under the applied paving mixture from deteriorating or expanding. Additionally, the combination of a binding layer and an aggregate layer provides a surface with a degree of elasticity that will resist cracking, molding, rutting, or similar deformation or damage, due to the binding layer providing a dynamic element to the aggregate material. In this regard, the binding material fills in the space, or gaps, between aggregate materials, providing a more consistent aggregate base material that has less air gaps and more cohesion.

The amount of binding material used in the paving mixture may vary based on the desired performance and adhesion of the aggregate material. The binding material may contain bitumen, at least one emulsifier, and/or other materials that form asphalt or similar surface forming materials, including sand, polymers, cross-linking agents, vulcanization agents, accelerators, extenders, fluxing agents, an acid (such as hydrochloric acid (HCl) and tall oil), aliphatic, open-chain, or aliciyclic hydrocarbons (such as mineral spirits). The binding material may also form a polymer modified asphalt emulsion (PMAE) or hot-asphalt cement, a petroleum solvent cutback asphalt, and other similar or analogous compositions. The viscosity of the binding material layer may be varied with the addition of different materials or heat. Varying the viscosity provides different diffusion properties of the binding material across the surface to which it is applied, which may be desirable based on the amount of wear of the surface or the textural irregularities of the surface. In some embodiments, the binding material further comprises water.

Additionally, the amount of binding material used may result in, at least a portion of, bitumen being pulled to the top of the road surface immediately prior to, during, or shortly after compaction (i.e. pull through). Traditionally, this pull through may limit the viability of the general use of a newly compacted road surface until the pulled bitumen is dispersed or an additional lift (i.e. a second paving mixture layer) is applied on top of the original lift. Some aspects of the paving mixtures described herein may provide, at a minimum, an improvement over traditional paving mixtures by reducing the amount of binding material used in a given lift and thereby reducing the bitumen pull through. As used herein, "residue" or "residual" refers to bituminous portion of the binding material, such as Emulsion Bonding Liquid (EBL). In other words, the residue is what is left when the water in the binder evaporates. As used herein "shot rate" refers to an amount of binding material applied to the referenced surface. For an illustrative example, a shot rate of 2.00 gallons/yd$^2$ on a road surface refers to applying 2.00 gallons/yd$^2$ of binding material on the road surface.

Additionally, the portion of the paving mixture that comprises the binding material or asphalt solution may be varied based on the amount of adhesion needed to allow the paving mixture to withstand wear, movement, deformation, and/or cracking. Additionally, the aggregate material may be applied such that the paving mixture forms a layer at least 0.75 inches thick after application, and/or compaction, for example 1.00 inches, 1.25 inches, 1.5 inches, 2 inches, 2.25 inches, 2.5 inches, 2.75 inches, 3 inches, 3.25 inches, 3.5 inches, 3.75 inches, or 4 inches.

The aggregate material layer provides a structural component with compressive strength and durability. The aggregate material may comprise sand, gravel, crushed stone, slag, rock dust, and/or the like. The aggregate material may also include small or micro sized aggregate materials, or rather a pulverulent material, to provide a more densely packed or organized paving mixture. Exemplary pulverulent materials may include fine sand or dust, which enhance the consistency of the paving mixture by better distributing the aggregate materials throughout the paving mixture. This also allows the aggregate material to mix with the binding material more effectively, and reduces air gaps in the paving mixture. In addition, the aggregate material may include a synthetic aggregate.

An asphalt solution comprising bitumen may be added to the aggregate mixture. The asphalt solution may be the same as or similar to the binding material, providing an adhesive or bonding element in the aggregate material layer. By including the asphalt solution, or binding element, in the aggregate mix, there is enhanced bonding between the aggregate materials prior to distribution over the binding material layer. A pulverulent material, such as sand or fine rock dust, may be added to the asphalt mix to help control the diffusion of the asphalt mix during application when the aggregate particles are otherwise large. Larger aggregate particles are desirable for structural support reasons, but may allow an asphalt mix to spread or run too quickly when the aggregate is applied to the surface. The asphalt solution or asphalt mixture may further comprise a bituminous material comprising at least one of asphalt cement, pitch, coal tar, vacuum tower bottoms, resid, performance grade asphalts, flux, and petroleum based products. Additionally, the asphalt contained in the aggregate mixture may coat some or all of the aggregate particles in the mixture to create a Hot Mix Asphalt (HMA), which may be appropriate in circumstances that require a high amount of diffusion of the binding material. An aggregate mixture is considered a HMA asphalt when the temperature of the aggregate mixture is at least 230 degrees Fahrenheit. A HMA provides increased distribution and uniformity of the binding material amongst the aggregate material in the aggregate material layer, due to the heat. A Warm Mix Asphalt (WMA) may also be used for similar purposes. An asphalt mix is considered a WMA when the asphalt is heated to at least 100 degrees Fahrenheit. A Cold Mix Asphalt (CMA) may also be used where the asphalt is approximately ambient temperature, and no enhanced diffusion of the binding material is desired. The type of asphalt used, and the heat applied, may be determined based on ambient conditions and the desired diffusion or mixing of the binding and aggregate materials, prior to any compaction.

Heating the binding material and/or aggregate material also helps to increase mixing of the binding material and the aggregate material once the layers are combined, providing a more uniform, durable paving mixture. When a liquid asphalt emulsion is used as the binding material, the asphalt emulsion may be formulated to have a low viscosity to help the binding material (i.e., asphalt emulsion) penetrate throughout the aggregate mixture, coating a higher percentage of the aggregate material in the aggregate material layer.

In one aspect, the paving mixture described herein reduced pull through by using a binding material in the binding layer that has a high residue, such as greater than 75%, greater than 80%, greater than 85%, or 90%. In combination with the high residue binder material, the shot rate can be reduced far below the typical industry practice. For example, the shot rate could be 0.025 gallons/yd$^2$ or similar. In one aspect, the residue of the binding material in the binding layer differs from the residue of the binding material used to form the aggregate material layer. The shot rate can vary with the thickness of the lift.

The shot rate can be adjusted based on the air void % in the aggregate material layer and thickness of the aggregate material layer to avoid pull through. For example, with a 68% residue binding layer, the shot rate can be less than 0.028 gal/sqyd when the aggregate layer is 0.75 inch thick with a 3% air void mixture to avoid pull through. For example, with a 68% residue binding layer, the shot rate can be less than 0.037 gal/sqyd when the aggregate layer is 1 inch thick with a 3% air void mixture to avoid pull through. For example, with a 68% residue binding layer, the shot rate can be less than 0.038 gal/sqyd when the aggregate layer is 1.5 inch thick or greater with a 3% air void mixture to avoid pull through. For example, with a 68% residue binding layer, the shot rate can be less than 0.032 gal/sqyd when the aggregate layer is 0.75 inch thick with a 3.5% air void mixture to avoid pull through. For example, with a 68% residue binding layer, the shot rate can be less than 0.043 gal/sqyd when the aggregate layer is 1 inch thick with a 3.5% air void mixture to avoid pull through. For example, with a 68% residue binding layer, the shot rate can be less than 0.044 gal/sqyd when the aggregate layer is 1.5 inch thick or greater with a 3.5% air void mixture to avoid pull through.

In one aspect, a paving mixture for application to a surface is provided. In some aspects, the mixture comprises a binding material layer that is applied to the surface to form a base layer on the surface. An aggregate material layer is then applied on top of the binding material layer, the binding and aggregate layers mixing to form a solid surface. The binding material layer can be applied on the surface in an amount of at most 0.125 gallons/yd$^2$. For example, in some aspects the binding material layer can be applied with a shot rate of 0.125 gallons/yd$^2$, 0.120 gallons/yd$^2$, 0.115 gallons/yd$^2$, 0.110 gallons/yd$^2$, 0.105 gallons/yd$^2$, 0.100 gallons/yd$^2$, 0.095 gallons/yd$^2$, 0.090 gallons/yd$^2$, 0.085 gallons/yd$^2$, 0.080 gallons/yd$^2$, 0.075 gallons/yd$^2$, 0.070 gallons/yd$^2$, 0.065 gallons/yd$^2$, 0.060 gallons/yd$^2$, 0.055 gallons/yd$^2$, 0.050 gallons/yd$^2$, 0.045 gallons/yd$^2$, 0.040 gallons/yd$^2$, 0.035 gallons/yd$^2$, 0.030 gallons/yd$^2$, 0.025 gallons/yd$^2$, or any other amount ≤0.125 gallons/yd$^2$. In an aspect, for example, the shot rate is 0.037 gallons/yd$^2$. The shot rate selected can depend on the residual of the binding material layer and the thickness of the pavement.

The aggregate material layer comprises an asphalt mixture of bitumen and aggregate that provides a road surface. The aggregate material layer and the binding material layer can be combined on the surface within 30 seconds of application of the binding material layer to allow for adequate mixing of the layers and prevent undesired diffusion of the binding material layer on the surface.

In some aspects, the mixture comprises a first binding material layer that is applied to the surface to form a base layer on the surface. A first aggregate material layer is then applied on top of the first binding material layer, the first binding and first aggregate layers mixing to form a first solid surface. The first solid surface may be described as a first lift.

In aspects, a second lift can be added to the first to form a road surface. The mixture further comprises a second binding material layer that is applied to the first solid surface. A second aggregate material layer is then applied on top of the second binding material layer, the second binding and second aggregate layers mixing to form a second solid surface. In an aspect, the first binding material layer of the second lift is applied on the surface in an amount of at most 0.075 gallons/yd$^2$. In an aspect, the first and the second binding material layer is applied on the respective surfaces in an amount of at most 0.075 gallons/yd$^2$. In an aspect, the second binding material layer is applied on the first solid surface in an amount of at most 0.075 gallons/yd$^2$. The first aggregate material layer and the first binding material layer can be combined on the surface within 30 seconds of application of the first binding material layer to allow for adequate mixing of the layers and prevent undesired diffusion of the binding material layer on the surface. The second aggregate material layer and the second binding material layer can be combined on the surface within 30 seconds of application of the second binding material layer to allow for adequate mixing of the layers and prevent undesired diffusion of the second binding material layer on the surface.

Further, the first solid surface may be used as a road surface for general traffic use for a predetermined period of time prior to application of the second binding material layer. The predetermined period of time may be determined by the situational desires and/or necessities. For instance, the first solid surface may be used to ease traffic congestion until a relative lull in traffic provides an opportunity to apply the second binding layer and second aggregate layer. For another example, changes in weather conditions or equipment availability may temporarily prevent or frustrate the application of the second binding layer and/or second aggregate layer. In such a scenario, the first solid surface may be used for general traffic until such time as the weather conditions are more favorable or the equipment is available to add the second lift. Those skilled in the art will understand that traffic congestion, weather conditions, and equipment availability are merely illustrative of the situational desires and/or necessities that may determine the predetermined period of time.

In some aspects, a paving mixture is a dense graded mix (e.g., Superpave, Marshall or Hveem procedures). The dense graded mix can be either fine-graded or coarse-graded. Fine-graded mixes have more fine and sand sized particles than coarse-graded mixes. In some aspects, a paving mixture is an open graded mix (e.g., open-graded asphalt friction courses (OGFC), asphalt treated permeable bases (ATPB), and the like). In some aspects, the paving mixture comprises a layer of dense graded mix and a layer of open-graded mixes.

The portion of the paving mixture that comprises the binding material or asphalt solution may be varied based on the amount of adhesion needed to allow the paving mixture to withstand wear, movement, deformation, and/or cracking. Additionally, the aggregate material may be applied such that the paving mixture forms a layer at least 0.75 inches thick after application, and/or compaction, for example 0.75 inches, 1.00 inches, 1.25 inches, 1.5 inches, 2 inches, 2.25 inches, 2.5 inches, 2.75 inches, 3 inches, 3.25 inches, 3.5 inches, 3.75 inches, or 4 inches.

In another aspect, a method for applying a paving mixture to a surface is provided, in accordance with an embodiment of the present invention. In some embodiments, the method comprises applying a binding material layer to the surface to form a base layer on the surface, applying an aggregate material layer on top of the binding material layer, and compacting the binding material layer and the aggregate material layer together, wherein the binding material layer is applied in an amount of at most 0.075 gallons/yd$^2$ on the surface. The aggregate material layer contains an asphalt mixture that provides a road surface, and the aggregate material layer and the binding material layer are combined on the surface within 30 seconds of application of the binding material layer. As discussed herein, compacting of the binding material layer and the aggregate material layer may be accomplished using a roller machine or a mechanical compaction apparatus. Further, the application of the paving mixture may be accomplished by a spray paver or by traditional tack and break paving equipment.

In some aspects, the method comprises applying multiple paving mixtures to a surface is provided, in accordance with an embodiment of the present invention. The method comprises applying a first binding material layer to the surface to form a base layer on the surface, applying an aggregate material layer on top of the binding material layer, and compacting the first binding material layer and the first aggregate material layer together providing a first road surface, applying a second binding material layer to the first road surface, applying a second aggregate material layer on top of the second binding material layer, wherein the first binding material layer and/or the second binding material layer is applied in an amount of at most 0.075 gallons/yd$^2$. The first and second aggregate material layer can be the same, similar or different in composition.

The first and second binding material layers can be applied in the same, similar, or different amounts of gallons/yd$^2$. For example, in an aspect both the first and second binding material layers can be applied in an amount ≤0.075 gallons/yd$^2$. In an embodiment, the first binding material layer can be in an amount ≤0.075 gallons/yd$^2$ and the second binding material layer can be applied in an amount other than the amount other than that of the first binding layer. For illustrative purposes, the second binding material layer may be applied in amounts greater than 0.125 gallons/yd$^2$; such as 0.235 gallons/yd$^2$, 0.275 gallons/yd$^2$, 0.315 gallons/yd$^2$, 0.355 gallons/yd$^2$, 0.395 gallons/yd$^2$, 0.435 gallons/yd$^2$, 0.470 gallons/yd$^2$, 0.510 gallons/yd$^2$, 0.550 gallons/yd$^2$, 0.590 gallons/yd$^2$, 0.630 gallons/yd$^2$, or any other amount. Further, the second binding material layer can be applied in an amount less than 0.125 gallons/yd$^2$ as well.

In an embodiment, the second binding material can be applied in an amount ≤0.075 gallons/yd$^2$ and the first binding material layer can be applied in an amount other than the amount other than that of the first binding layer. For illustrative purposes, the first binding material layer may be applied in amounts greater than 0.125 gallons/yd$^2$; such as 0.235 gallons/yd$^2$, 0.275 gallons/yd$^2$, 0.315 gallons/yd$^2$, 0.355 gallons/yd$^2$, 0.395 gallons/yd$^2$, 0.435 gallons/yd$^2$, 0.470 gallons/yd$^2$, 0.510 gallons/yd$^2$, 0.550 gallons/yd$^2$, 0.590 gallons/yd$^2$, 0.630 gallons/yd$^2$, or any other amount. Further, the first binding material layer can be applied in an amount less than 0.125 gallons/yd$^2$ as well.

Figure 1:
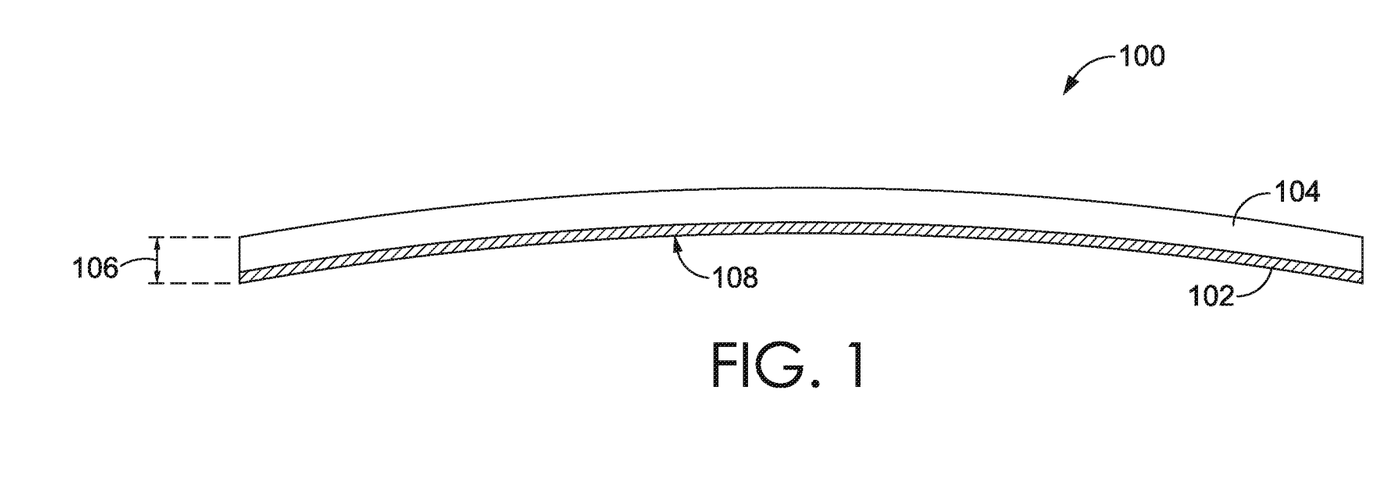
FIG. 1 depicts a paving mixture applied to a surface, in accordance with aspects of the present invention.

Turning now to FIG. 1, an exemplary paving mixture applied to a surface is shown, in accordance with an embodiment of the present invention. In FIG. 1, a surface 108 is depicted with a paving mixture 100 applied on top of the surface 108 with an even distribution, which may result after mechanical compaction of the paving mixture 100. The paving mixture 100 includes a binding material layer 102 proximate to the surface 108, and an aggregate material layer 104 applied on top of the binding material layer 102. The paving mixture 100 has a thickness 106 after application and/or after compaction of the layers. For example, the paving mixture 100 thickness 106 may be 0.75 inches, 1.00 inches, 1.25 inches, 1.5 inches, 2 inches, 2.25 inches, 2.5 inches, 2.75 inches, 3 inches, 3.25 inches, 3.5 inches, 3.75 inches, 4 inches, or more.

In some aspects, the binding material layer 102 is formed with a shot rate of at most 0.075 gallons/yd$^2$ to surface 108. For example, in some aspects the binding material layer can be applied with a shot rate of, 0.070 gallons/yd$^2$, 0.065 gallons/yd$^2$, 0.060 gallons/yd$^2$, 0.055 gallons/yd$^2$, 0.050 gallons/yd$^2$, 0.045 gallons/yd$^2$, 0.040 gallons/yd$^2$, 0.035 gallons/yd$^2$, 0.030 gallons/yd$^2$, 0.025 gallons/yd$^2$, or any other amount ≤0.075 gallons/yd$^2$. In an aspect, for example, the shot rate is 0.037 gallons/yd$^2$. In an aspect, the aggregate material layer 104 may be applied in an amount determined by the desired road surface characteristics.

In some aspects, binding material layer 102 is formed with a shot rate determined based on the desired thickness 106 of the aggregate material layer 104 and the % residue in binding material such that the binding material comprises between 65% and 90% of the binding material. Said another way, 65%≤binding material % residue ≤90% (such as 75%, 80%, 85%, or 90%). For example, with brief reference to FIGS. 5a-d and continued reference to FIG. 1 an example set of shot rates for a 75% residue binding material (FIG. 5a), 80% residue binding material (FIG. 5b), 85% residue binding material (FIG. 5c), and 90% residue binding material (FIG. 5d) is provided.

Figure 5A:
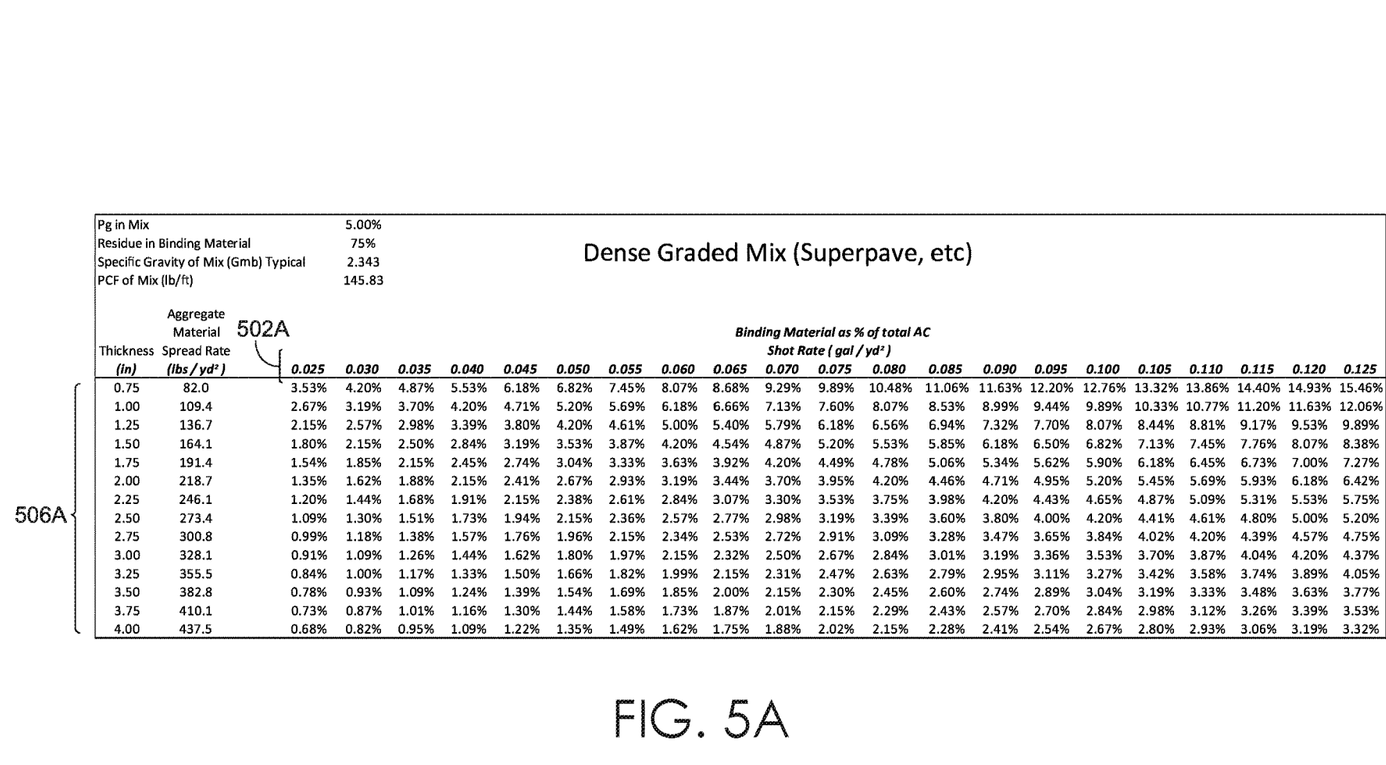

As depicted in FIGS. 5a-d, example thicknesses 506a-d of the paving mixing, example binding material shot rates 502a-d, and the % bitumen supplied by the binding material 510a-d are provided. Turning briefly to FIG. 1 and FIG. 5a, a set of example shot rates 502a and a set of example thickness 506a is provided for a binding material with a residue of 75%; a specific gravity of the mix (Gmb) of about 2.3 (for example, 2.2, 2.3, 2.4, or 2.5); and the pavement mixture density of about 145 pounds per cubic foot (pcf) is provided. For example, in an aspect a shot rate of 0.125 gallons/yd$^2$ of binding material may be applied to the surface 108 along with the aggregate material layer 104 to form a paving mixture 100 with a thickness 106 of 1.5-inches. In such an aspect, the binding material layer 102 comprises about 8% of the total bitumen by weight.

Turning briefly to FIG. 1 and FIG. 5d, a set of example shot rates 502d and a set of example thickness 506d is provided from a binding material with a residue of 90%; a specific gravity of the mix (Gmb) of about 2.3 (for example, 2.2, 2.3, 2.4, or 2.5); and the pavement mixture density of about 145 pounds per cubic foot (pcf) is provided. For example, in an aspect a shot rate of 0.070 gallons/yd$^2$ of binding material may be applied to the surface 108 along with the aggregate material layer 104 to form a paving mixture 100 with a thickness 106 of 1.0-inches. In such an aspect, the binding material layer 102 comprises about 8% of the total bitumen by weight. It will be understood by those skilled in the art that the remaining combinations illustratively presented in FIGS. 5a-d are omitted merely for the sake of clarity and brevity. As such, a specific combination's omission is not intended to limit the scope of the aspects discussed herein. Accordingly, it will be understood by those skilled in the art that the % residue, shot rates, specific gravity, density, aggregate material spread rate, and surface thickness identified are merely illustrative in nature, as such any % residue, shot rates, specific gravity, density, aggregate material spread rate, and surface thickness are contemplated by and considered within the scope of the aspects discussed herein.

In some aspects, the binding material layer 102 is formed with a shot rate determined such that the residual is applied in an amount of at most 0.075 gallons/yd$^2$. For example, a binding material that is 90% residual can be applied with a shot rate of at most 0.041 gallons/yd$^2$ so that the residual is applied in an amount of at most 0.125 gallons/yd$^2$. For another example, a binding material that is 68% residual can be applied with a shot rate of at most 0.054 gallons/yd$^2$.

Figure 2:
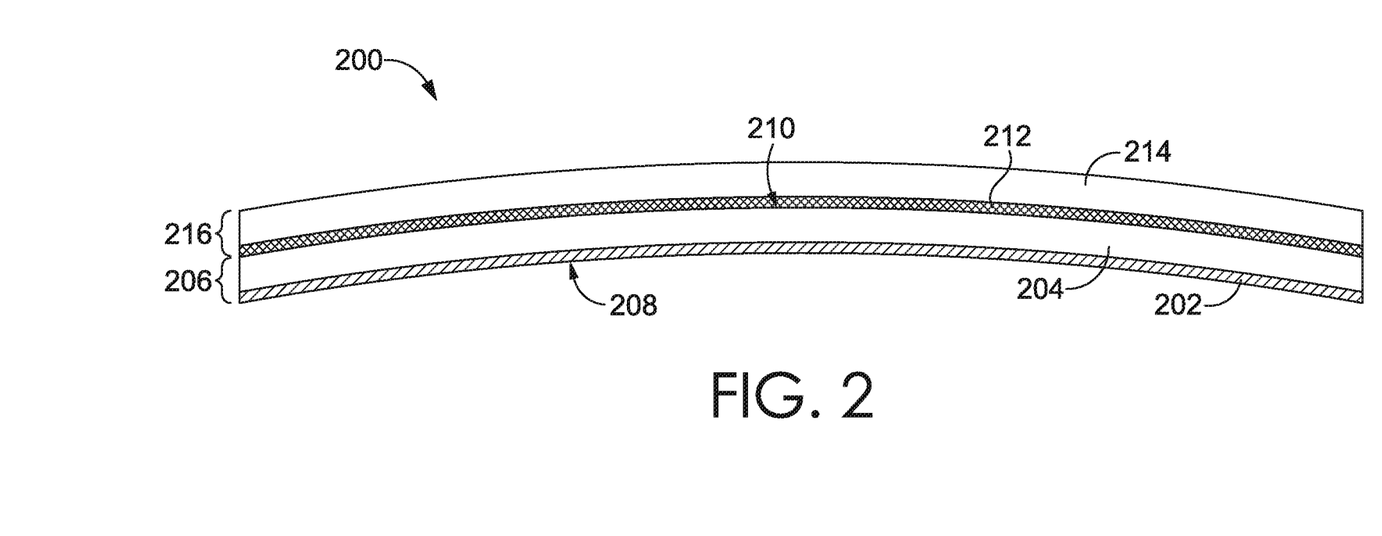
FIG. 2 depicts a multi-layer paving mixture applied to a surface, in accordance with aspects of the present invention.

Turning to FIG. 2, a multi-layer paving mixture 200 applied to a surface is shown, in accordance with aspects of the present invention. In FIG. 2, a surface 208 is depicted with a first layer of paving mixture 206 and a second layer of paving mixture 216 applied on top of the surface 208. The first layer of paving mixture 206 is applied on top of surface 208 with an even distribution, which may result after mechanical compaction of the paving mixture 206 and/or 216. The second layer of paving mixture 216 is applied on top of surface 210 with an even distribution, which may result after mechanical compaction of the paving mixture 216.

The first paving mixture 206 comprises a first binding material layer 202 proximate to the surface 208 and a first aggregate material layer 204 applied on top of the binding material layer 202. The second paving mixture 216 comprises a second binding material layer 212 proximate to surface 210 and a second aggregate material layer 214 applied on top of the binding material layer 212.

In some aspects, the first binding material layer 202 and the second binding material layer 212 is formed with a shot rate of at most 0.125 gallons/yd$^2$ to surface 108 and surface 210 respectively. In some aspects, the first binding material layer 202 or the second binding material layer 212 is formed with a shot rate of at most 0.125 gallons/yd$^2$ to surface 108 or surface 210 respectively. Additionally, in some aspects the first binding material layer 202 and/or the second binding material layer 212 may be formed as described in reference to FIG. 1.

In some aspects, the first binding material layer 202 or the second binding material layer 212 the shot rate is determined such that the residue comprise ≥13% of the bitumen in the paving mixture by weight. In such an aspect, the shot rate depends on the bitumen composition of the aggregate material used to form the aggregate material layer 104 and the residual of the binding material layer 102. For the sake of clarity several illustrative examples follow. The following examples are based on a residue of 65%; a specific gravity of the mix (Gmb) of about 2.3 for example, 2.2, 2.3, 2.4, or 2.5; and the pavement mixture density of about 145 pounds per cubic foot (pcf). This may provide a stable surface and allows varying degrees of mixture between the binding material and the aggregate material, depending on the desired structural characteristics of the paving mixture. For example, in an aspect a distribution of 0.235 gallons/yd$^2$ of binding material may be applied to the surface to form a 1.5-inch thick surface. In an aspect, a distribution of 0.275 gallons/yd$^2$ of binding material may be applied to the surface to form a 1.75-inch thick surface. In an aspect, a distribution of 0.315 gallons/yd$^2$ of binding material may be applied to the surface to form a 2-inch thick surface. In an aspect, a distribution of 0.355 gallons/yd$^2$ of binding material may be applied to the surface to form a 2.25-inch thick surface. In an aspect, a distribution of 0.395 gallons/yd$^2$ of binding material may be applied to the surface to form a 2.5-inch thick surface. In an aspect, a distribution of 0.435 gallons/yd$^2$ of binding material may be applied to the surface to form a 2.75-inch thick surface. In an aspect, a distribution of 0.470 gallons/yd$^2$ of binding material may be applied to the surface to form a 3-inch thick surface. In an embodiment, a distribution of 0.510 gallons/yd$^2$ of binding material may be applied to the surface to form a 3.25-inch thick surface. In an aspect, a distribution of 0.550 gallons/yd$^2$ of binding material may be applied to the surface to form a 3.50-inch thick surface. In an aspect, a distribution of 0.590 gallons/yd$^2$ of binding material may be applied to the surface to form a 3.75-inch thick surface. In an aspect, a distribution of 0.630 gallons/yd$^2$ of binding material may be applied to the surface to form a 4.00-inch thick surface. It will be understood by those skilled in the art that the shot rates and surface thickness identified are merely illustrative in nature, as such any surface thickness and corresponding shot rate are contemplated by and considered within the scope of the aspects discussed herein.

For example, in some aspects, the first binding material layer 202 is formed with a shot rate of ≤0.125 gallons/yd$^2$ on surface 208. The first aggregate material layer 204 may comprise any amount of aggregate, pulverulent material, and bitumen. The first layer of paving mixture 206 may be any suitable thickness, as determined by the desired characteristics of the first paving layer of paving mixture 206, after application and/or after compaction of the layers. Further, the second binding material layer 212 may be formed with a shot rate of ≤0.125 gallons/yd$^2$ on surface 210. The second aggregate material layer 214 may comprise any amount of aggregate, pulverulent material, and bitumen. The second layer of paving mixture 216 may be any suitable thickness, as determined by the desired characteristics of the second paving layer of paving mixture 216, after application and/or after compaction of the layers. In an aspect, the total residual (i.e. the residual of the first binding layer 202 and the residual of the second binding layer 212) comprises ≤46% of the total bitumen in the multi-layer paving mixture 200. The first aggregate material layer and the first binding material layer can be combined on the surface within 30 seconds of application of the first binding material layer to allow for adequate mixing of the layers and prevent undesired diffusion of the binding material layer on the surface. Additionally, the second aggregate material layer and the second binding material layer can be combined on the surface within 30 seconds of application of the binding material layer to allow for adequate mixing of the layers and prevent undesired diffusion of the binding material layer on the surface.

For another example, in some aspects, the first binding material layer 202 is formed with a shot rate of ≤0.125 gallons/yd$^2$ on surface 208. The first aggregate material layer 204 may comprise any amount of aggregate, pulverulent material, and bitumen. The second binding layer 212 is formed with a shot rate determined such that the residual of the second binding layer 212 comprises >13% of the bitumen in the second layer of paving mixture 216 (i.e. second binding layer 212 and second aggregate layer 214). Accordingly, in such an aspect the shot rate of the second binding layer 212 is directly related to the relationship between the residual of the second binding layer 212, the bitumen concentration of the second aggregate layer 214, and the volume of the second aggregate used to form the second aggregate layer 214.

For yet another example, in some aspects, The first binding layer 202 is formed with a shot rate determined such that the residual of the first binding layer 202 comprises >13% of the bitumen in the first layer of paving mixture 206 (i.e. first binding layer 202 and first aggregate layer 204). Accordingly, in such an aspect the shot rate of the first binding layer 202 is directly related to the relationship between the residual of the first binding layer 202, the bitumen concentration of the first aggregate layer 204, and the volume of the first aggregate used to form the first aggregate layer 214. Further, the second binding material layer 212 is formed with a shot rate of ≤0.125 gallons/yd$^2$ on surface 210. The second aggregate material layer 214 may comprise any amount of aggregate, pulverulent material, and bitumen. In an aspect, the first binding layer 202 residue comprises ≥67% of the total residual (i.e. the residual of the first binding layer 202 and the residual of the second binding layer 212). In an aspect, the second binding layer 212 residue comprises ≤46% of the total residual (i.e. the residual of the first binding layer 202 and the residual of the second binding layer 212).

Figure 3:
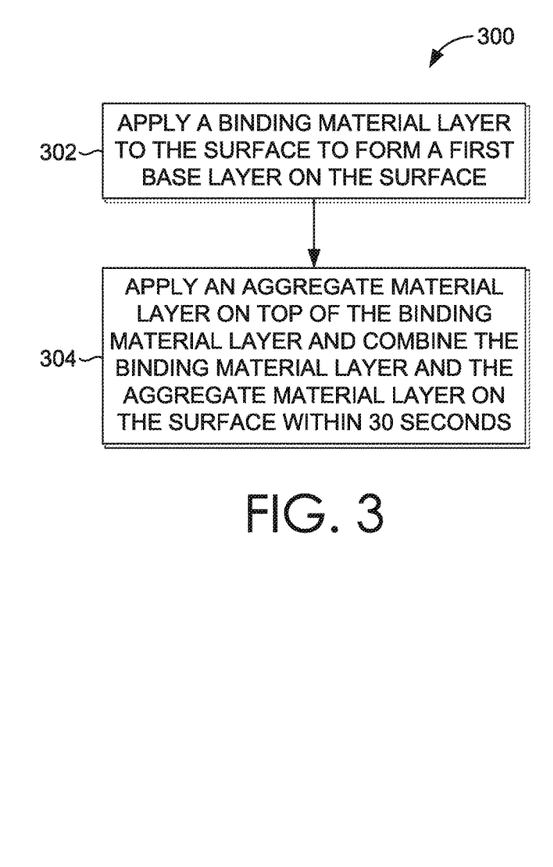
FIG. 3 depicts a first method of applying a paving mixture to a surface, in accordance with aspects of the present invention.

Referring to FIG. 3, an exemplary method 300 for applying a paving mixture to a surface is provided, in accordance with an aspect of the present invention. In FIG. 3, at a first step 302, a binding material layer is applied to a surface to form a base layer on the surface. The binding material (e.g., bitumen) in the binding material layer has a residue of at least 80%. The residue of the binding material in the aggregate mixture can be different. In some aspects, the binding material layer can be applied as discussed with reference to FIG. 1. For example, in an aspect, the binding material layer can be applied to the surface with a shot rate of not more than 0.50 gallons/yd$^2$. At a second step 304, an aggregate material layer is applied on top of the binding material layer. The aggregate material layer and the binding material layer can be combined on the surface within 30 seconds of application of the binding material layer. Further, in some aspects the binding material layer and the aggregate material layer are combined together by mechanical compaction.

Figure 4:
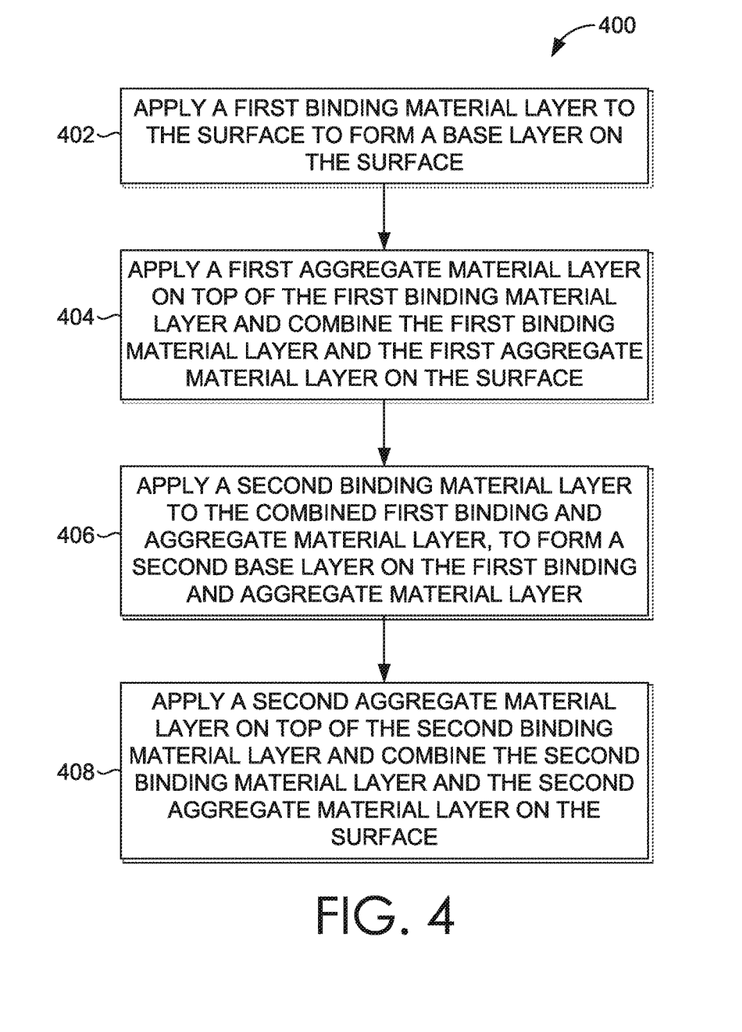
FIG. 4 depicts a second method of applying a paving mixture to a surface, in accordance with aspects of the present invention.

Referring to FIG. 4 an exemplary method 400 of applying a multi-layer paving mixture to a surface is provided, in accordance with an aspect of the present invention. At a first step 402, a first binding material layer is applied to a surface to form a base layer on the surface. The binding material in the binding material layer has a residue of at least 80%. In some aspects, the first binding material layer can be applied as discussed with reference to FIG. 1 or FIG. 2. At a second step 404, a first aggregate material layer is applied on top of the first binding material layer. The first aggregate material layer and the first binding material layer can be combined on the surface within 30 seconds of application of the binding material layer. Further, in some aspects the first binding material layer and the first aggregate material layer are combined together by mechanical compaction. At a third step 406, a second binding material layer is applied on top of the first aggregate material layer (or the combined first binding material and first aggregate material layer). In some aspects, the second binding material layer can be applied as discussed with reference to FIG. 1 or FIG. 2. At a fourth step 408, a second aggregate material layer is applied on top of the second binding material layer. The second aggregate material layer and the second binding material layer can be combined on the surface within 30 seconds of application of the second binding material layer. Further, in some aspects the binding material layer and the aggregate material layer are combined together by mechanical compaction.

Embodiments of the technology have been described to be illustrative rather than restrictive. Alternative embodiments will become apparent to readers of this disclosure. Further, alternative means of implementing the aforementioned elements and steps can be used without departing from the scope of the claims below, as would be understood by one having ordinary skill in the art. Certain features and subcombinations are of utility and may be employed without reference to other features and subcombinations, and are contemplated as within the scope of the claims.

The invention claimed is:

1. A road surface, the mixture comprising:
   a binding material layer forming a base layer of the road surface, the binding material in the binding material layer having a residue of at least 80%; and
   an aggregate material layer applied on top of the binding material layer,
   wherein the binding material layer comprises an amount of at most 0.050 gallons/yd$^2$ on the surface,
   wherein the aggregate material layer comprises a mixture of aggregate and bitumen that provides a road surface.

2. The road surface of claim 1, wherein the binding material layer comprises at most 90% of an emulsifier and a bitumen.

3. The road surface of claim 1, wherein the road surface is at least 2.5 inch thick.

4. The road surface of claim 1, wherein the paving mixture comprises a non-slag synthetic aggregate.

5. The road surface of claim 1, wherein the binding material layer and the aggregate material layer are at least 100 degrees Fahrenheit at the time of application.

6. The road surface of claim 1, wherein the binding material layer is between 150 degrees Fahrenheit and 212 degrees Fahrenheit at the time of application.

7. The road surface of claim 1, wherein the aggregate material layer is at least 230 degrees Fahrenheit at the time of application.

8. The road surface of claim 1, wherein at least a portion of the aggregate comprises a synthetic aggregate.

9. The road surface of claim 1, wherein the aggregate includes at least one material selected from the group consisting of sand, gravel, crushed stone, slag, and rock dust.

10. A method for applying a paving mixture to a surface, the method comprising:
    applying a binding material layer to the surface to form a base layer on the surface, the binding material in the binding material layer having a residue of at least 80%;
    applying an aggregate material layer on top of the binding material layer; and
    compacting the binding material layer and the aggregate material layer together,
    wherein the binding material layer is applied in an amount of at most 0.050 gallons/yd$^2$ on the surface, and
    wherein the aggregate material layer comprises a mixture of aggregate, pulverulent material, and bitumen that provides a road surface and wherein the aggregate, pulverulent material and bitumen are mixed prior to application to the binding material.

11. The method of claim 10, further comprising heating the binding material layer and the aggregate material layer to at least 100 degrees Fahrenheit prior to application.

12. The method of claim 10, further comprising heating the binding material layer to at least 230 degrees Fahrenheit prior to application.

13. The method of claim 10, wherein the paving mixture is greater than 2.5 inches thick after application.

14. The method of claim 10, wherein the aggregate includes at least one material selected from the group consisting of sand, gravel, crushed stone, slag, and rock dust.

15. The method of claim 10, wherein at least a portion of the aggregate comprises a synthetic aggregate.

16. A method of applying a paving mixture to a surface, the method comprising:
    applying a binding material layer to the surface to form a base layer on the surface at a rate of at most 0.050 gallons/yd$^2$, wherein the binding material in the binding material layer having a residue of at least 80%; and
    applying an aggregate material layer on top of the material layer,
    wherein the aggregate material layer comprises a mixture of aggregate, pulverulent material, and bitumen that provides a road surface and wherein the aggregate, pulverulent material and bitumen are mixed prior to application to the binding material.

17. The method of claim 16, wherein the binding material in the binding material layer comprises at most 90% residue.

18. The method of claim 16, wherein the paving mixture is greater than ¾ inch thick after application.

19. The method of claim 16, wherein the aggregate includes at least one material selected from the group consisting of sand, gravel, crushed stone, slag, and rock dust.

20. The mixture of claim 16, wherein the binding material is applied in an amount of at most 0.040 gallons/yd$^2$ on the surface.

\* \* \* \* \*